United States Patent
Greenwood

[15] 3,653,274
[45] Apr. 4, 1972

[54] BELT TRACKING ARRANGEMENT

[72] Inventor: Sidney Greenwood, Santa Monica, Calif.

[73] Assignee: Nitto Kohki U.S.A., Inc., Santa Monica, Calif.

[22] Filed: July 1, 1970

[21] Appl. No.: 51,546

[52] U.S. Cl. ................................................74/241
[51] Int. Cl. ..............................................F16h 7/18
[58] Field of Search .............................74/241, 242

[56] References Cited

UNITED STATES PATENTS 2,470,615   5/1949   Groyer........................................74/241
1,432,832   10/1922  Brocket......................................74/241
3,159,268   12/1964  Dyke......................................74/241 X

*Primary Examiner*—Leonard H. Gerin
*Attorney*—Herzig & Walsh

[57] ABSTRACT

A belt operated tool having a bracket for mounting the front idle pulley around which the belt travels. The bracket is L-shaped, having two legs, and the position of the legs can be adjusted with respect to each other by a bolt, to reposition the idle pulley and change the belt tracking.

7 Claims, 5 Drawing Figures

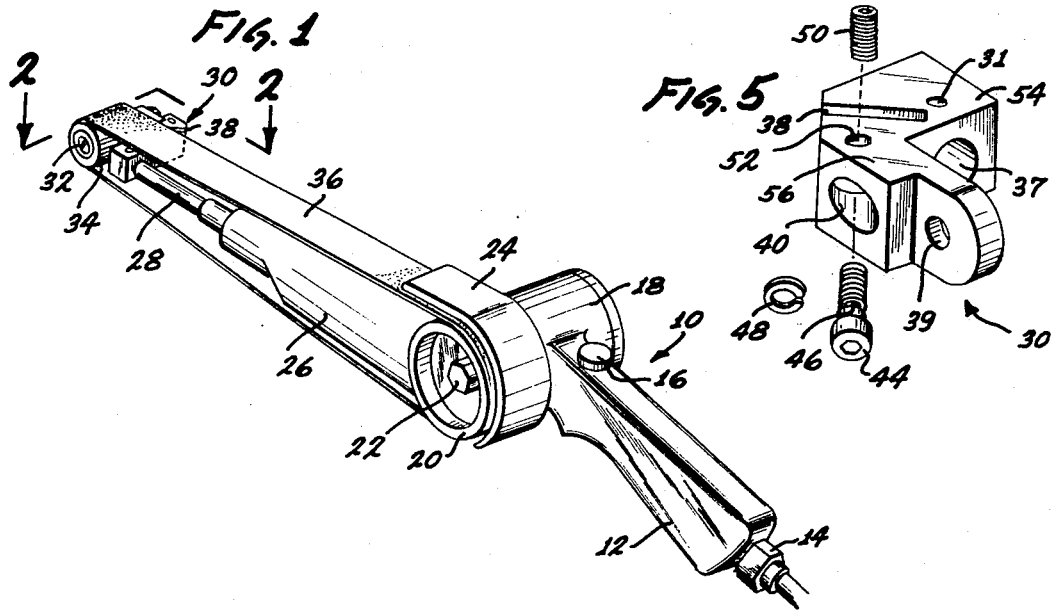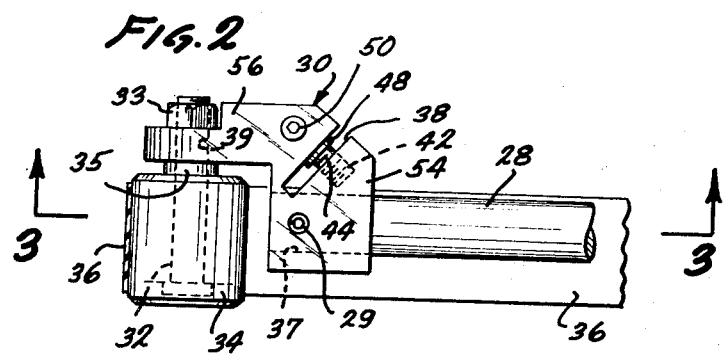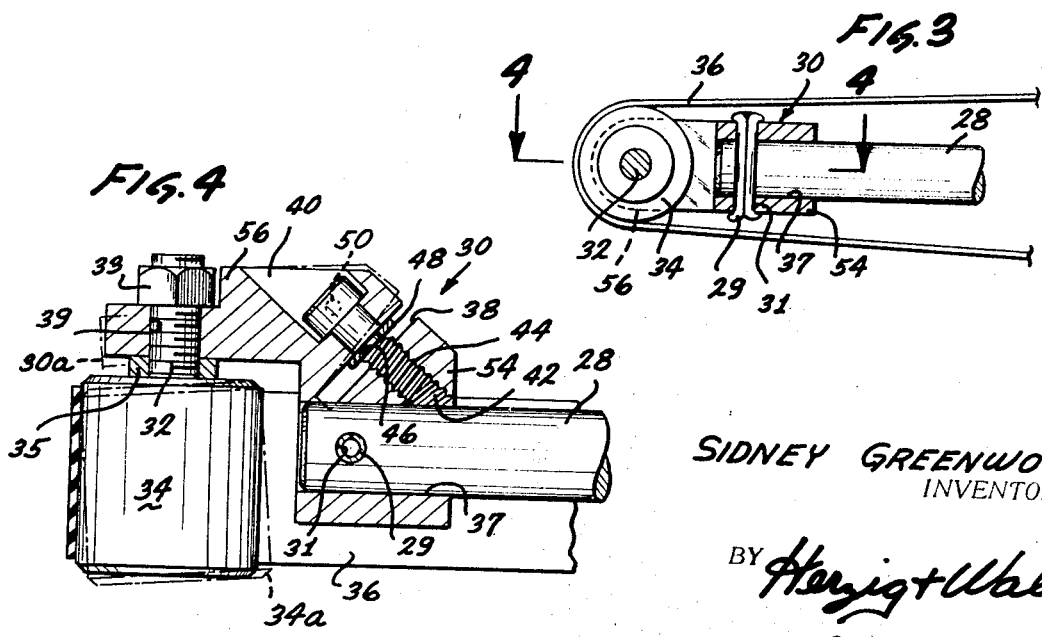

3,653,274

BELT TRACKING ARRANGEMENT

SUMMARY OF THE INVENTION

This invention relates to an adjustment arrangement for a belt operated tool and more particularly to a pulley adjustment for maintaining proper tracking of the belt on the tool.

Belt operated tools are highly desirable industrial tools and are typically used for sanding, buffing, and polishing, etc. The adaptability of the belt operated tool for handling all of these applications is one of its prime advantages. A problem that arises in the usage of a belt operated tool relates to the tracking of the belt on the pulleys of the tool such that the belt travels around the pulleys during usage without riding off them. Unless the pulleys and belt are in a proper relationship, the belt will have a tendency to ride off the pulley. This can result in the operator not obtaining full performance from his belt operated tool, and having to spend a large amount of time replacing the belt on the pulleys.

One solution to this problem has been to place the front pulley of the belt operated tool in a vise and proceed to manipulate the axis about which the pulley rotates. Through a trial and error method in this manner, it was possible to obtain the correct tracking for the belt, so that it would not tend to run off the pulley. The difficulty that arises with this method, however, is that it is highly time consuming to have to put the pulley in a vise and, in a trial and error method, to find the proper angle for the axis, such that the pulley can rotate without the belt running off. Furthermore, after numerous trial and error determinations of determining the proper axis for the pulley to rotate about, the shaft tends to weaken, thereby making the adjustment much more inexact and the pulley does not stay in adjustment very long before readjustment becomes necessary.

Accordingly, it is the principal aim of the present invention to provide an improved belt operated tool that is capable of having the belt precisely adjusted for proper tracking.

The collateral object of the invention is to provide a belt operated tool having an adjusting arrangement for the belt which is characterized by its high efficiency and reliability in operation, which is simple, compact and economical in construction, and which can be readily installed in pre-existing belt operated tools without extensive modification thereto.

Other objects and advantages of the invention will appear from the following description, taken in conjunction with the accompanying drawings, in which:

FIG. 1 is a pictorial view of a belt operated tool embodying the features of the present invention;

FIG. 2 is a partial plan view of the tracking arrangement taken substantially along line 2 — 2 of FIG. 1;

FIG. 3 is a cross-sectional view taken substantially along line 3 — 3 of FIG. 2;

FIG. 4 is an enlarged cross-sectional view taken substantially along line 4 — 4 of FIG. 3; and FIG. 5 is an exploded perspective view of the tracking apparatus of the present invention.

DESCRIPTION OF THE PREFERRED EMBODIMENT

Referring now to FIG. 1, an over-all view of an exemplary belt operated tool of the present invention is illustrated: The belt operated tool indicated generally at 10 and shown typically as a belt sander has a handle 12 at the base of which is a connector 14 for connecting the belt sander to a source of air. Also on the handle is a valve control member 16 which allows the passage of air to the motor 18. On the motor shaft is a drivewheel 20 which is secured to the shaft by means of a drive lock nut 22. Cover 24 is adjustable and encloses the rear drive wheel. Extending from the rear drive wheel is a guard 26 which has connected to it a rod 28 between which is an extension spring (not shown). Rod 28 is connected to an aperture 37 in the adjusting bracket 30 which in turn has front idle pulley shaft 32 mounted thereto in aperture 39. Front idle pulley 34 rotates around shaft 32. The belt 36 rotates around the front pulley and the rear drive wheel when air is allowed to the motor.

In accordance with one of the important aspects of the present invention, provision is made on bracket 30 for enabling the tracking of the belt 36 around front idle pulley 34 and rear drive wheel 20 such that the belt will rotate in such a manner so as not to come off the front idle pulley. As shown more clearly in FIGS. 2 through 5, bracket 30 is generally L-shaped and has legs 54 and 56 which have a slot 38 arranged at a 45° angle between them on the bracket. Positioned transversely to the slot in leg 56 is a counterbore 40 and in leg 54 is a threaded portion 42. Passing through the counterbore 40 is a bolt 44 which has a groove 46 as more clearly shown in FIG. 5. The position of this groove coincides with the opening of the slot as the bolt is passed through the counterbore to the threaded portion of the bracket. A C-ring 48 is used to secure the bolt in the counterbore so that the bolt cannot be removed therefrom.

To secure leg 54 of the bracket 30 to rod 28, a roll pin 29 is provided through aperture 37 and through an aperture in the rod as illustrated in FIG. 3. The connection of rod 28 to the bracket provides a fixed arrangement for the leg 54 of the bracket. Pulley shaft 32 is connected to the bracket 30 by means of a nut 33 as shown in FIG. 2. Furthermore, between the pulley and the bracket is a spacer 35.

In order to adjust the front idle pulley so that the belt tracks properly therearound, bolt 44 is turned, thereby moving leg 56 of bracket 30 either closer or further away to fixed leg 54. In this manner, the bracket and the pulley as shown at 30a and 34a can be slightly repositioned so as to allow the belt to track properly. The desired position can then be locked by tightening set screw 50 in aperture 52 which locks the bolt 44, which in turn secures the relationship of the position of leg 56 with respect to leg 54.

From the foregoing, those skilled in the art will readily observe and understand the nature and construction of the invention and the method and the manner in which the invention achieves and realizes all of the objects and aims as set forth in the foregoing, as well as the many additional advantages that are apparent from the detailed description.

The foregoing disclosure is representative of a preferred embodiment of the invention and is to be interpreted in an illustrative rather than a limiting sense, the invention to be accorded the full scope of the claims appended hereto.

What is claimed is:

1. A Belt operated tool of the type described, having a drive wheel, a front idle pulley, and a belt rotating around said drive wheel and said pulley, the improvement comprising a bracket for positioning said front idle pulley and having means therein adapted to be opened and closed wherein the opening and closing of said means changes the position of the front idle pulley, thereby changing the tracking of the belt around the pulley, said means comprising facing surfaces of a slot formed in the bracket.

2. A belt operated tool according to claim 1, wherein said bracket is generally L-shaped, said means being positioned at a 45° angle in said bracket.

3. A belt operated tool according to claim 1, wherein said means has two sides and said bracket has a counterbore and a threaded portion on either side of said means.

4. A belt operated tool according to claim 3, further including securement means extending through said counterbore and through said means and being engaged in said threaded portion of said bracket.

5. A belt operated tool according to claim 4, wherein a C-washer positioned in said means secures said securement means in said counterbore.

6. A belt operated tool according to claim 5, further including an aperture in said bracket positioned transversely to said counterbore, and a set screw for passing through said aperture to lock said securement means in said counterbore when the desired tracking of said belt around said pulley is attained.

7. A belt operated tool according to claim 6, wherein said securement means is a bolt.

* * * * *